United States Patent
Hosotani (10) Patent No.: US 8,724,352 B2
(45) Date of Patent: May 13, 2014

(54) POWER SUPPLY APPARATUS DRIVING CIRCUIT, POWER SUPPLY APPARATUS DRIVING INTEGRATED CIRCUIT, AND POWER SUPPLY APPARATUS

(75) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 53 days.

(21) Appl. No.: 13/610,134

(22) Filed: Sep. 11, 2012

(65) Prior Publication Data

US 2013/0242620 A1      Sep. 19, 2013

Related U.S. Application Data

(63) Continuation of application No. PCT/JP2011/053223, filed on Feb. 16, 2011.

(30) Foreign Application Priority Data

Mar. 16, 2010   (JP) .................................. 2010-059479

(51) Int. Cl.
  *H02M 3/335*   (2006.01)
  *H02M 1/36*    (2007.01)
(52) U.S. Cl.
  USPC .................. 363/49; 363/21.08; 363/21.02
(58) Field of Classification Search
  USPC ......... 363/21.02, 21.03, 21.08, 21.16, 49, 97; 323/901
  See application file for complete search history.

(56) References Cited

U.S. PATENT DOCUMENTS

| 5,903,451 | A | * | 5/1999 | Wu et al. ........................ 363/49 |
| 6,018,467 | A | * | 1/2000 | Majid et al. .................... 363/16 |
| 6,191,967 | B1 | | 2/2001 | Katayama et al. |
| 2003/0198066 | A1 | | 10/2003 | Kasai et al. |
| 2004/0227547 | A1 | | 11/2004 | Shiraishi et al. |
| 2005/0078490 | A1 | * | 4/2005 | Yokoyama et al. ............. 363/16 |
| 2005/0218489 | A1 | | 10/2005 | Satou et al. |
| 2007/0115697 | A1 | | 5/2007 | Ando et al. |

(Continued)

FOREIGN PATENT DOCUMENTS

| JP | 5-344719 A | 12/1993 |
| JP | 7-274498 A | 10/1995 |

(Continued)

OTHER PUBLICATIONS

Official Communication issued in International Patent Application No. PCT/JP2011/053223, mailed on Apr. 26, 2011.

*Primary Examiner* — Gary L Laxton
(74) *Attorney, Agent, or Firm* — Keating & Bennett, LLP (57) ABSTRACT

In a power supply apparatus driving circuit, at startup, an input voltage of a switching power supply is used as a driving power supply, and loss generated in a starting circuit is reduced. The starting circuit and the driving circuit are configured as a single driver. A control IC generates a switching control signal to control a first switching element and a second switching element. A driving circuit in a high breakdown voltage driver IC generates gate drive voltage signals for the first switching element and the second switching element based on the switching control signal inputted from the control IC. A starting circuit supplies the partial voltage of a voltage inputted to a starting power supply terminal, to each of the driving circuit in the high breakdown voltage driver IC and the control IC that is externally provided, and shuts off a switching element after startup.

17 Claims, 6 Drawing Sheets

(56) References Cited

U.S. PATENT DOCUMENTS

| | | | |
|---|---|---|---|
| 2007/0171687 A1* | 7/2007 | Kogel et al. | 363/49 |
| 2007/0247879 A1* | 10/2007 | Yang | 363/49 |
| 2009/0284991 A1 | 11/2009 | Nishikawa | |

FOREIGN PATENT DOCUMENTS

| | | |
|---|---|---|
| JP | 11-327500 A | 11/1999 |
| JP | 2002-136123 A | 5/2002 |
| JP | 2002-325451 A | 11/2002 |
| JP | 2004-7953 A | 1/2004 |
| JP | 2004-112926 A | 4/2004 |
| JP | 2004-342735 A | 12/2004 |
| JP | 2005-294464 A | 10/2005 |
| JP | 2007-158963 A | 6/2007 |
| JP | 2007-166887 A | 6/2007 |
| JP | 2008-166298 A | 7/2008 |
| JP | 2009-303474 A | 12/2009 |

* cited by examiner

POWER SUPPLY APPARATUS DRIVING CIRCUIT, POWER SUPPLY APPARATUS DRIVING INTEGRATED CIRCUIT, AND POWER SUPPLY APPARATUS

BACKGROUND OF THE INVENTION

1. Field of the Invention

The present invention relates to a power supply apparatus driving circuit, a power supply apparatus driving integrated circuit, and a power supply apparatus, which include a low-side switching element and a high-side switching element with different ground potential levels in a switching power supply apparatus.

2. Description of the Related Art

For example, Japanese Unexamined Patent Application Publication No. 7-274498 discloses a power supply apparatus that includes a low-side switching element and a high-side switching element with different ground potential levels, and drives the low-side switching element and the high-side switching element by means of a control IC.

Figure 1:
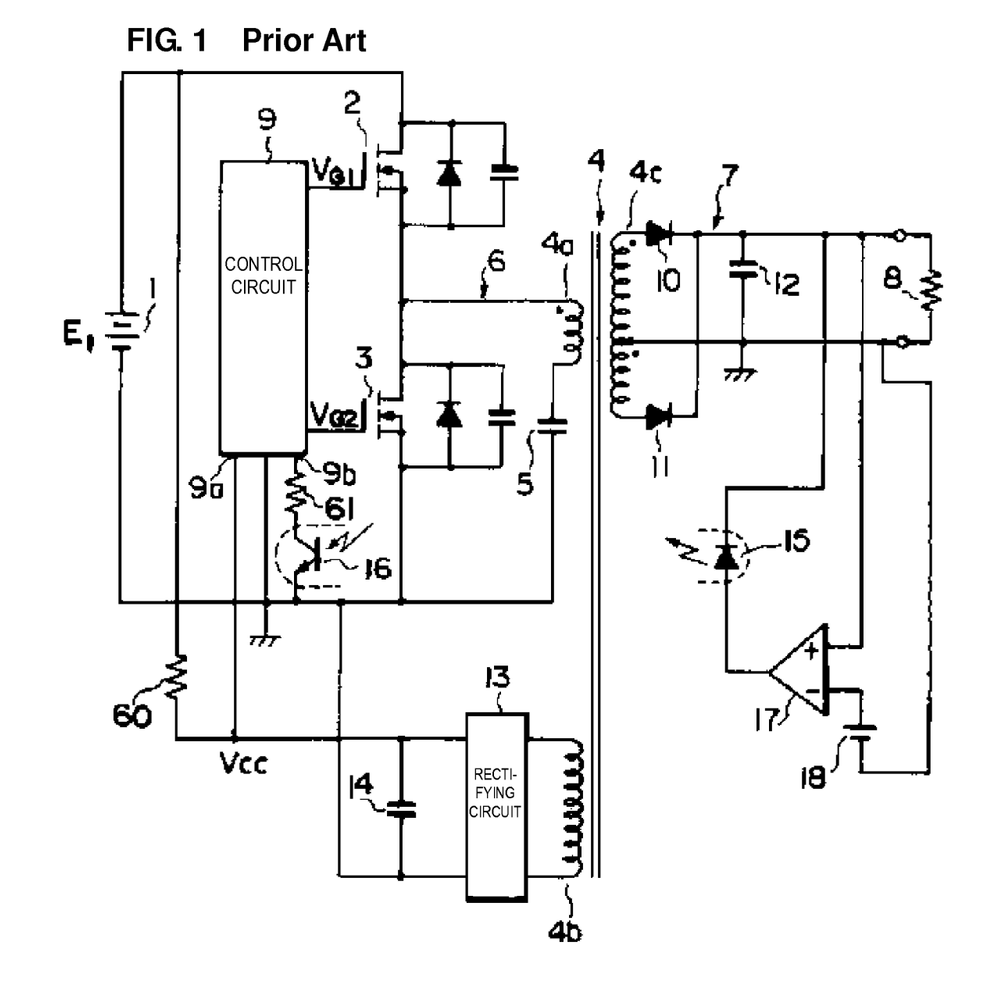
FIG. 1 is a circuit diagram of a power supply apparatus exemplified as related art in Japanese Unexamined Patent Application Publication No. 7-274498.

FIG. 1 is a circuit diagram of the power supply apparatus exemplified as related art in Japanese Unexamined Patent Application Publication No. 7-274498. This power supply apparatus includes a DC power supply 1, first and second field effect transistors (FETs) 2 and 3, an output transformer 4, a resonant circuit 6, a load 8, and a control circuit 9. The first and second FETs 2 and 3 respectively serve as first and second switching elements that are connected between one end and the other end of the DC power supply 1. The output transformer 4 has a primary winding 4a, a secondary winding 4c, and a tertiary winding 4b. The resonant circuit 6 includes the primary winding 4a of the output transformer 4 which is connected in series with each of the first and second FETs 2 and 3, a resonant capacitor 5, and a resonance reactor configured by an inductance that is formed integrally with the primary winding 4a. The load 8 is connected to the secondary winding 4c of the output transformer 4 via a rectifier smoothing circuit 7. The control circuit 9 operates from the voltage across the tertiary winding 4b of the output transformer 4, and supplies a control signal to the gate terminal (control terminal) of each of the first and second FETs 2 and 3 to control on/off of the first and second FETs.

The rectifier smoothing circuit 7 includes diodes 10, 11, and a smoothing capacitor 12. A voltage induced in the second primary winding 4b of the output transformer 4 is supplied to a power supply terminal 9a of the control circuit 9 via a rectifying circuit 13 and a smoothing capacitor 14. A signal of the output voltage to the load 8 is fed back to a current sensing element 9b of the control circuit 9 via an operational amplifier 17, a reference voltage source 18, photo-couplers 15, 16, and a limiting resistor 61.

In the related art, as illustrated in FIG. 1, the power supply apparatus that drives the low-side switching element and the high-side switching element by means of the control IC is configured so that, at startup, driving voltage is supplied to the control circuit via a starting resistor 60 from a high voltage that is the input voltage of the switching power supply, and during normal operation, voltage is supplied from the transformer.

However, current continues to flow through the starting resistor 60 even after startup, thus generating loss. A conceivable way to eliminate the loss due to the starting resistor is to provide a switching circuit that disconnects the starting resistor and the control circuit from each other. However, the switching circuit is required to have high breakdown voltage.

Accordingly, the entire control circuitry including the control circuit and the switching circuit needs to be designed with high breakdown voltage.

With such a configuration, the control circuit differs for each converter system, which limits the number of power supply apparatuses that can be used. Also, high breakdown voltage designs are required. For such reasons, when constructing an integrated control circuit, the resulting control IC becomes very expensive.

To address this problem, it is effective to configure the control circuit portion of the converter by two control ICs, by dividing the control circuit portion into a drive circuit for driving the FETs, and a control signal generating circuit for generating pulse waveforms that serve as control signals. In this case, the control signal generating circuit portion is configured by a low breakdown voltage process to thereby reduce cost, and for the driving circuit that requires a high breakdown voltage process, cost can be reduced by making different converter systems common and hence increasing the number of power supply apparatuses that can be used. As a result, it is possible to realize a low-cost control circuit, even through the control circuit is configured by two control ICs.

However, in the above related art, the driving circuit configured by a high breakdown voltage process requires another power supply apparatus to supply the driving voltage for the switching elements, and it is necessary to provide another power supply apparatus to start and operate the main converter. Therefore, it is not possible to miniaturize the power supply apparatus as a whole.

SUMMARY OF THE INVENTION

Preferred embodiments of the present invention provide a low-cost control circuit by dividing a control circuit portion of a converter into a driving circuit that drives FETs, and a control signal generating circuit that generates pulse waveforms serving as control signals. Further, preferred embodiments of the present invention provide a low-cost, high-efficiency control circuit that uses the input voltage of a switching power supply which is a high voltage, as a driving power supply for a driving circuit that drives a high-side switching element, and reduces loss generated in a starting circuit. Also, preferred embodiments of the present invention provide a starting circuit and a driving circuit, which are the portions of a control circuit that require a high breakdown voltage process, defined by a single driving integrated circuit (driver IC), to provide a power supply apparatus that can be used in combination with control ICs for a low breakdown voltage process used for many applications.

According to a preferred embodiment of the present invention, a power supply driving circuit is included in a power supply apparatus and outputs an auxiliary supply voltage, the power supply apparatus includes a DC power supply input section to which a DC input voltage is inputted, a series circuit that is connected to both ends of the DC power supply input section directly or indirectly via a circuit element, and includes at least a first switching element on a low side and a second switching element on a high side, the first switching element and the second switching element having ground levels different from each other, and a switching element control circuit that generates a switching control signal to control the first switching element and the second switching element, the power supply apparatus driving circuit includes a driving circuit that controls a voltage on a control terminal of each of the first switching element and the second switching element on a basis of the switching control signal, and a starting circuit that supplies a starting supply voltage to the switching element control circuit and the driving circuit from the DC input voltage at startup, the starting circuit shutting off supply of the starting supply voltage when the auxiliary supply voltage is supplied to the switching element control circuit and the driving circuit after startup.

The starting circuit preferably includes a depression-type high breakdown voltage MOSFET that supplies the starting supply voltage when driven into conduction.

The driving circuit preferably includes a rectangular wave signal generating circuit that generates a first rectangular wave signal that is outputted to the first switching element, and a second rectangular wave signal that is outputted to the second switching element, on a basis of the switching control signal defined by a single signal, so that the generated rectangular wave signals cause the first switching element and the second switching element to repeatedly switch on and off in a complementary manner.

The driving circuit preferably includes a rectangular wave signal generating circuit that generates a first rectangular wave signal that is outputted to the first switching element, and a second rectangular wave signal that is outputted to the second switching element, on a basis of the switching control signal defined by two signals that are repeatedly switched on and off in a complementary manner.

The driving circuit preferably includes a dead time generating circuit that generates the first rectangular wave signal and the second rectangular wave signal while inserting a dead time between the first rectangular wave signal and the second rectangular wave signal, so that the first switching element and the second switching element do not switch on simultaneously.

The dead time generating circuit preferably generates a first dead time from a falling edge of the first rectangular wave signal to a rising edge of the second rectangular wave signal, and a second dead time from a falling edge of the second rectangular wave signal to a rising edge of the first rectangular wave signal, the second dead time being regulated to a time different from the first dead time.

The driving circuit preferably includes a cross time generating circuit that generates the first rectangular wave signal and the second rectangular wave signal while inserting a cross time between the first rectangular wave signal and the second rectangular wave signal, so that the first switching element and the second switching element become conducting simultaneously.

The cross time generating circuit preferably generates a first cross time from a falling edge of the first rectangular wave signal to a rising edge of the second rectangular wave signal, and a second cross time from a falling edge of the second rectangular wave signal to a rising edge of the first rectangular wave signal, the second cross time being regulated to a time different from the first cross time.

A power supply apparatus driving circuit according to a preferred embodiment of the present invention is provided in a power supply apparatus, the power supply apparatus including a DC power supply input section to which a DC input voltage is inputted, a series circuit that is connected to both ends of the DC power supply input section, and includes at least a first switching element on a low side and a second switching element on a high side, the first switching element and the second switching element having ground levels different from each other, and a switching element control circuit that generates a switching control signal to control the first switching element and the second switching element, a driving circuit that controls a voltage on a control terminal of each of the first switching element and the second switching element on a basis of the switching control signal, and the power supply driving circuit includes a dead time generating circuit that generates a first rectangular wave signal that is outputted to the first switching element, and a second rectangular wave signal that is outputted to the second switching element while inserting a dead time between the first rectangular wave signal and the second rectangular wave signal, the dead time being a time during which the first switching element and the second switching element do not switch on simultaneously and the dead time generating circuit generates a first dead time from a falling edge of the first rectangular wave signal to a rising edge of the second rectangular wave signal, and a second dead time from a falling edge of the second rectangular wave signal to a rising edge of the first rectangular wave signal, the second dead time being regulated to a time different from the first dead time.

A power supply apparatus driving circuit according to a preferred embodiment of the present invention is provided in a power supply apparatus, the power supply apparatus including a DC power supply input section to which a DC input voltage is inputted, a series circuit that is connected to both ends of the DC power supply input section, and includes at least a first switching element on a low side and a second switching element on a high side, the first switching element and the second switching element having ground levels different from each other, and a switching element control circuit that generates a switching control signal to control the first switching element and the second switching element, a driving circuit that controls a voltage on a control terminal of each of the first switching element and the second switching element on a basis of the switching control signal, and the driving circuit includes a cross time generating circuit that generates a first rectangular wave signal that is outputted to the first switching element, and a second rectangular wave signal that is outputted to the second switching element while inserting a cross time between the first rectangular wave signal and the second rectangular wave signal, the cross time being a time during which the first switching element and the second switching element (Q2) become conducting simultaneously, and the cross time generating circuit generates a first cross time from a falling edge of the first rectangular wave signal to a rising edge of the second rectangular wave signal, and a second cross time from a falling edge of the second rectangular wave signal to a rising edge of the first rectangular wave signal, the second cross time being regulated to a time different from the first cross time.

The switching control signal preferably is a digital signal configured by a binary logic level signal, or an analog signal.

In a power supply apparatus driving integrated circuit according to a preferred embodiment of the present invention, the power supply apparatus driving circuit preferably is configured by a single integrated circuit.

A power supply apparatus according to a preferred embodiment of the present invention includes a DC power supply input section to which a DC input voltage is inputted, a series circuit that is connected to both ends of the DC power supply input section, and includes at least a first switching element on a low side and a second switching element on a high side, the first switching element and the second switching element having ground levels different from each other, and a switching element control circuit that generates a switching control signal to control the first switching element and the second switching element, a driving circuit that controls a voltage on a control terminal of each of the first switching element and the second switching element on a basis of the switching control signal, and a starting circuit that supplies a starting supply voltage to the switching element control circuit and the driving circuit from the DC input voltage at startup, the starting circuit shutting off supply of the starting supply voltage when the auxiliary supply voltage is supplied to the switching element control circuit and the driving circuit after startup.

According to a preferred embodiment of the present invention, at startup, an operating voltage is supplied from the DC power supply input section via the staring circuit. Therefore, no DC power supply is necessary to drive the switching element control circuit and the driving circuit (high breakdown voltage process IC), thereby reducing the size and weight of the switching power supply apparatus.

When the operating voltage on the switching element control circuit and the driving circuit reaches a predetermined voltage, the starting circuit is disconnected to prevent overvoltage from being applied to the switching element control circuit and the driving circuit.

During normal operation, the switching element control circuit and the driving circuit are operated by a DC voltage supplied from the power supply apparatus. Therefore, loss in the starting circuit can be eliminated and higher efficiency is achieved.

The driving circuit and the starting circuit that require a high breakdown voltage process are preferably configured collectively as a single integrated circuit. Therefore, it is possible to increase production quantity by making the driving circuit common to different converter systems, thereby reducing cost. As a result, a low-cost power supply apparatus can be realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A power supply apparatus driving circuit and a power supply apparatus according to a first preferred embodiment are described with reference to FIG. 2.

Figure 2:
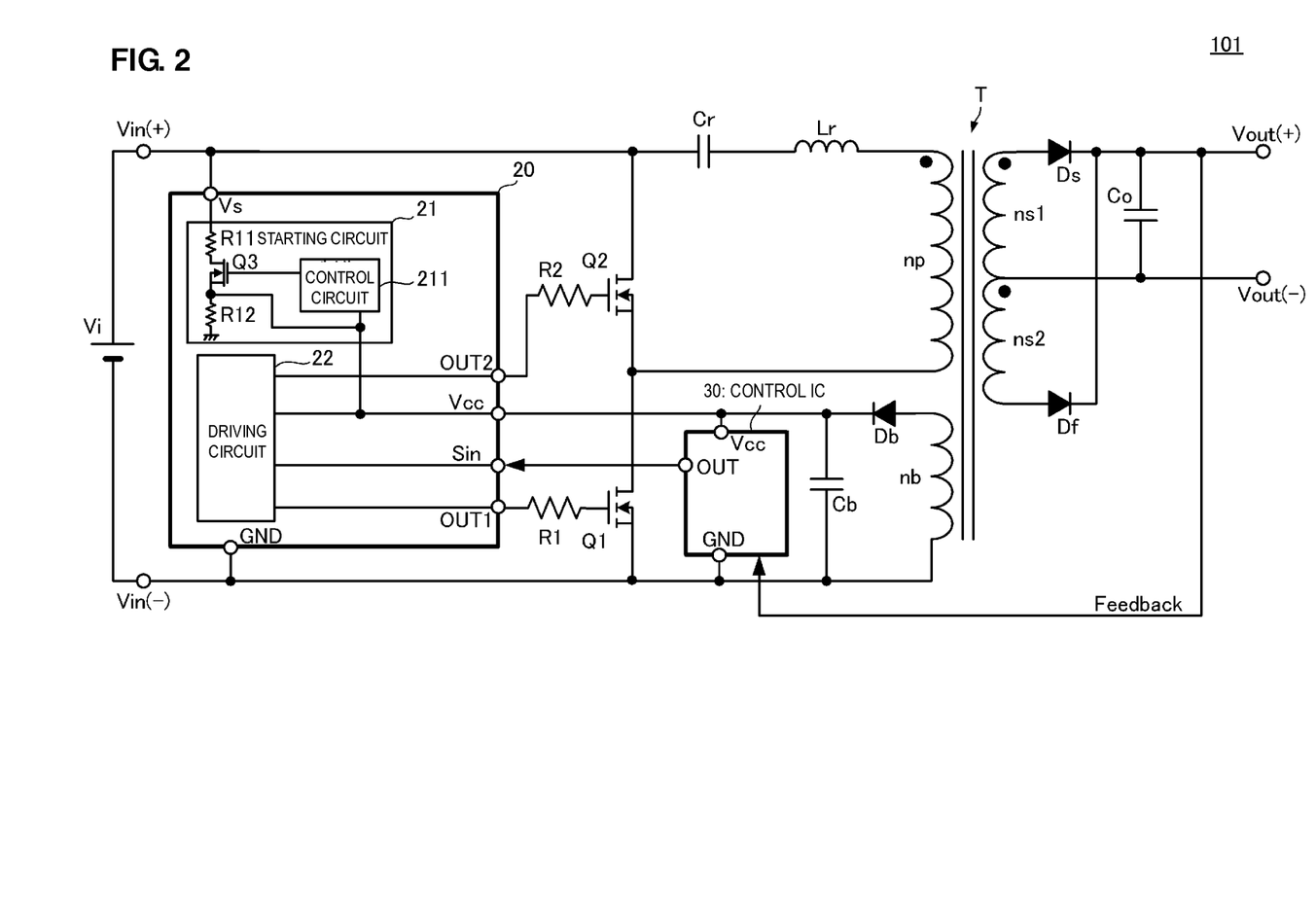
FIG. 2 is a circuit diagram of a switching power supply apparatus 101 including a power supply apparatus driving circuit according to a first preferred embodiment of the present invention.

FIG. 2 is a circuit diagram of a switching power supply apparatus 101 including the power supply apparatus driving circuit according to the first preferred embodiment. In the switching power supply apparatus 101, the voltage of DC input power supply Vi is inputted between its input terminals Vin(+), Vin(−). A predetermined DC voltage is outputted to a load connected between output terminals Vout(+), Vout(−) of the switching power supply apparatus 101.

A first series circuit is provided between the input terminals Vin(+), Vin(−). In the first series circuit, a capacitor Cr, an inductor Lr, a primary winding np of a transformer T, and a first switching element Q1 are connected in series. The first switching element Q1 is preferably defined by a FET. The drain terminal of the first switching element Q1 is connected to the primary winding np of the transformer T, and the source terminal is connected to the ground.

A second switching element Q2 is preferably defined by a FET. The drain terminal of the second switching element Q2 is connected to the input terminal Vin(+), and the source terminal is connected to the drain terminal of the first switching element Q1.

A first rectifier smoothing circuit is provided in a secondary winding ns1, ns2 of the transformer T. The first rectifier smoothing circuit includes a diode Ds, Df, and a capacitor Co. The first rectifier smoothing circuit rectifies and smoothes out all of the AC voltage outputted from the secondary winding ns1, ns2, and outputs the result to the output terminal Vout(+), Vout(−).

A rectifier smoothing circuit including a diode Db and a capacitor Cb is connected to a bias winding nb of the transformer T. A DC voltage obtained by this rectifier smoothing circuit is supplied as an auxiliary supply voltage between a GND terminal and a Vcc terminal of a control IC 30. The control IC corresponds to a "switching element control circuit" according to a preferred embodiment of the present invention.

The control IC 30 includes a circuit that generates a switching control signal to control the first switching element Q1 and the second switching element Q2, and outputs the switching control signal from the OUT terminal to a high breakdown voltage driver IC 20.

The high breakdown voltage driver IC 20 includes a driving circuit 22 and a starting circuit 21. The driving circuit 22 includes a rectangular wave signal generating circuit that generates gate drive voltage signals for the first switching element Q1 and the second switching element Q2 on the basis of the switching control signal inputted to a signal terminal Sin from the control IC 30, and outputs these signals to output terminals OUT1, OUT2. The driving circuit 22 operates with the partial voltage of the voltage inputted to the power supply terminal Vcc or the voltage inputted to a starting power supply terminal Vs as power supply.

The starting circuit 21 includes a switching element Q3, resistors R11, R12, and a control circuit 211. The switching element Q3 in the starting circuit 21 is conducting at startup. Therefore, a starting supply voltage applied to the starting power supply terminal Vs is divided by the resistors R11, R12, and supplied to the control IC 30 and the driving circuit 22. Accordingly, at startup of the switching power supply apparatus 101, the driving circuit 22 and the control IC 30 operate on the voltage inputted to the DC power supply input section Vin(+), Vin(−).

After startup, a DC voltage obtained by the rectifier smoothing circuit including the diode Db and the capacitor Cb is supplied as power supply to the control IC 30 and the driving circuit 22. The control circuit 211 in the starting circuit 21 compares a voltage applied to the Vcc terminal of the high breakdown voltage driver IC 20, with a reference voltage. When the voltage applied to the Vcc terminal exceeds the reference voltage, the switching element Q3 is shut off. Accordingly, thereafter, no current flows in from the starting power supply terminal Vs, thus eliminating wasted power consumption.

The switching element Q3 is a high breakdown voltage, depression-type (normally-On type) MOSFET. Therefore, Q3 is conducting in the state where no gate voltage is applied at startup, and a supply voltage is supplied to the driving circuit 22 and the control IC 30 via the switching element Q3.

The control circuit 211 in the starting circuit 21 may be also configured to compare an auxiliary supply voltage applied to the Vcc terminal of the high breakdown voltage driver IC 20, with a partial voltage due to the resistors R11, R12, and shut off the switching element Q3 when the auxiliary supply voltage applied to the Vcc terminal becomes higher than the partial voltage.

As described above, a switching circuit that selectively inputs a starting supply voltage is provided in the high breakdown voltage driver IC 20 including a driving circuit that drives the high-side switching element Q2, thereby eliminating problems that arise in the case of providing a starting circuit separately. Also, no special DC power supply circuit is required for the high breakdown voltage driver IC 20. Therefore, the switching power supply apparatus can be reduced in size and weight.

Second Preferred Embodiment

Figure 3:
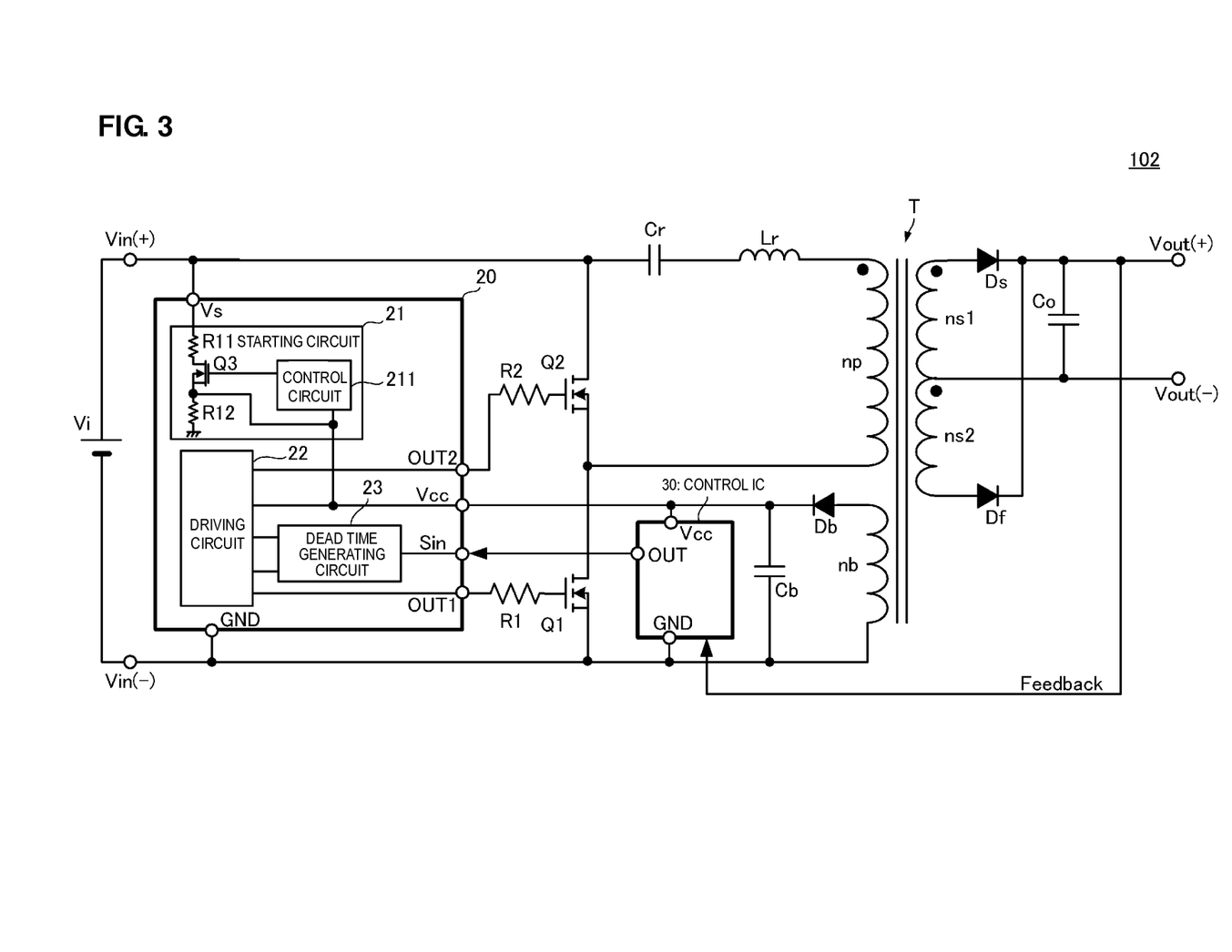
FIG. 3 is a circuit diagram of a switching power supply apparatus 102 including a power supply apparatus driving circuit according to a second preferred embodiment of the present invention.

FIG. 3 is a circuit diagram of a switching power supply apparatus 102 including a power supply apparatus driving circuit according to a second preferred embodiment. In the switching power supply apparatus 102, the high breakdown voltage driver IC 20 is provided with a dead time generating circuit 23. Otherwise, the configuration is the same as that illustrated in FIG. 2.

The dead time generating circuit 23 supplies a first timing signal for the first switching element Q1 and a second timing signal for the second switching element Q2 to the driving circuit 22, on the basis of a switching control signal outputted from the OUT terminal of the control IC 30.

The driving circuit 22 generates rectangular wave signals (gate drive voltage signals) for the first switching element Q1 and the second switching element Q2 on the basis of the first timing signal and the second timing signal inputted from the dead time generating circuit 23, and outputs these signals to output terminals OUT1, OUT2.

The dead time generating circuit 23 generates signals that have a timing relationship such that the first switching element Q1 and the second switching element Q2 are not switched on simultaneously. Therefore, the first switching element Q1 and the second switching element Q2 are not switched on simultaneously.

Third Preferred Embodiment

Figure 4:
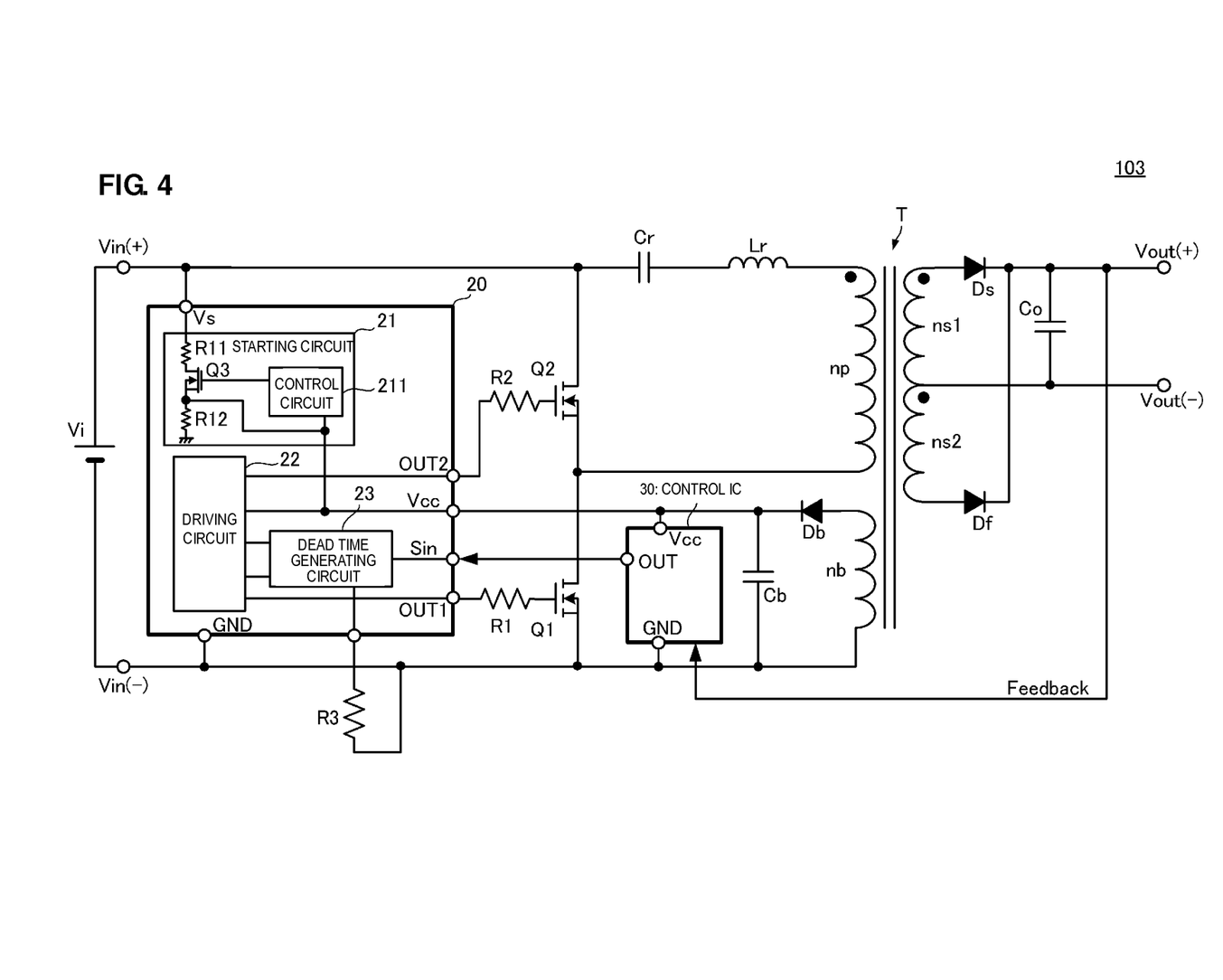
FIG. 4 is a circuit diagram of a switching power supply apparatus 103 including a power supply apparatus driving circuit according to a third preferred embodiment of the present invention.

FIG. 4 is a circuit diagram of a switching power supply apparatus 103 including a power supply apparatus driving circuit according to a third preferred embodiment. In the switching power supply apparatus 103, the high breakdown voltage driver IC 20 is provided with a dead time generating circuit 23. Also, there is provided an external resistor R3 that is connected to the dead time generating circuit 23. Otherwise, the configuration is preferably the same as that illustrated in FIG. 2.

The dead time generating circuit 23 sets the dead time of the dead time generating circuit 23 in accordance with the value of the external resistor R3. Since the required dead time varies with such factors as the response speeds of the low-side switching element Q1 and high-side switching element Q2, the inductance of the inductor Lr, and the capacitance of the capacitor Cr, the external resistor R3 can be set so as to provide an optimum dead time. Therefore, switching loss can be further reduced.

Fourth Preferred Embodiment

Figure 5:
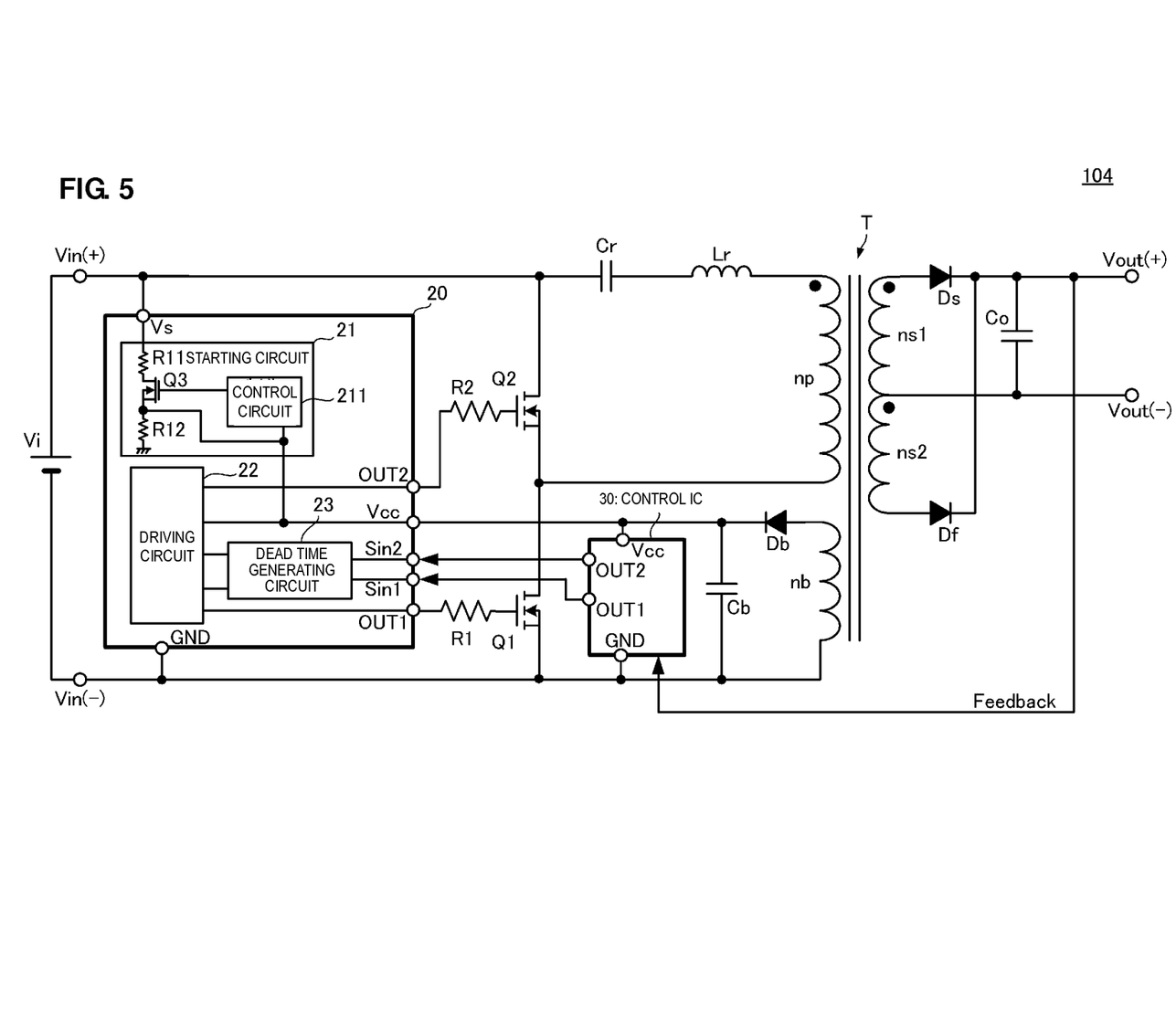
FIG. 5 is a circuit diagram of a switching power supply apparatus 104 including a power supply apparatus driving circuit according to a fourth preferred embodiment of the present invention.

FIG. 5 is a circuit diagram of a switching power supply apparatus 104 including a power supply apparatus driving circuit according to a fourth preferred embodiment. In the switching power supply apparatus 104, the high breakdown voltage driver IC 20 is provided with a dead time generating circuit 23. Also, the control IC 30 includes the function of outputting a switching control signal for the low-side switching element Q1, and a switching control signal for the high-side switching element Q2. Otherwise, the configuration is preferably the same as that illustrated in FIG. 2.

The dead time generating circuit 23 supplies a first timing signal for the first switching element Q1 and a second timing signal for the second switching element Q2 to the driving circuit 22, on the basis of switching control signals outputted from the OUT1, OUT2 terminals of the control IC 30. The dead time generating circuit 23 individually controls a first dead time from the turn-off of the first switching element Q1 to the turn-on of the second switching element Q2, and a second dead time from the turn-off of the second switching element Q2 to the turn-on of the first switching element Q1.

The driving circuit 22 generates rectangular wave signals (gate drive voltage signals) for the first switching element Q1 and the second switching element Q2 on the basis of the two timing signals from the dead time generating circuit 23, and outputs these signals to the output terminals OUT1, OUT2.

The required first dead time and second dead time vary with such factors as the response speeds of the low-side switching element Q1 and high-side switching element Q2, the inductance of the inductor Lr, and the capacitance of the capacitor Cr. The dead time generating circuit 23 outputs timing signals to the driving circuit 22 so as to make both the dead times optimum.

Fifth Preferred Embodiment

Figure 6:
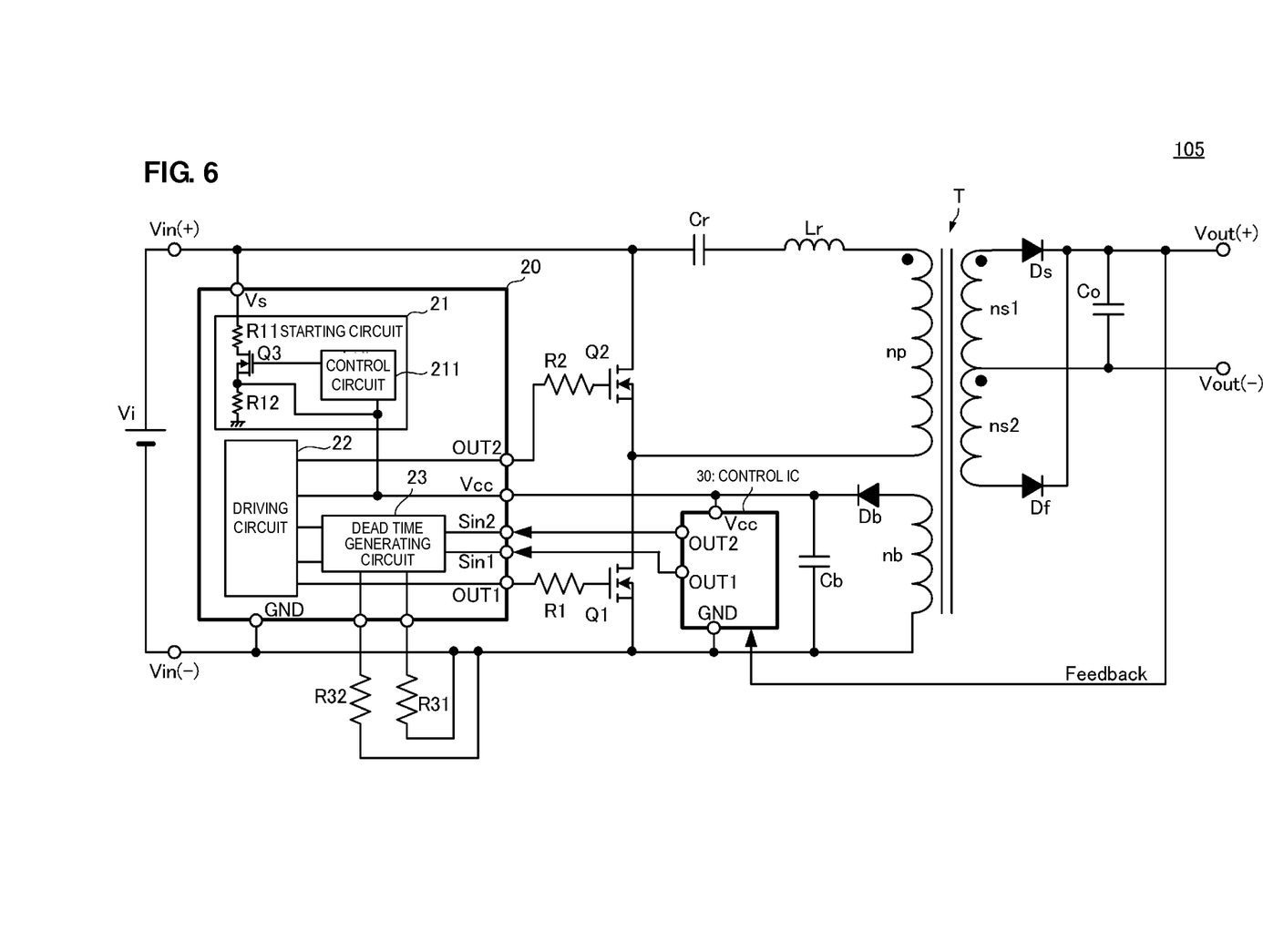
FIG. 6 is a circuit diagram of a switching power supply apparatus 105 including a power supply apparatus driving circuit according to a fifth preferred embodiment of the present invention.

FIG. 6 is a circuit diagram of a switching power supply apparatus 105 including a power supply apparatus driving circuit according to a fifth preferred embodiment. In the switching power supply apparatus 105, the high breakdown voltage driver IC 20 is provided with a dead time generating circuit 23. Also, there are provided external resistors R31, R32 that are connected to the dead time generating circuit 23. Otherwise, the configuration is preferably the same as that illustrated in FIG. 5.

The dead time generating circuit 23 sets a first dead time and a second dead time individually in accordance with the values of the external resistors R31, R32.

The required first dead time and second dead time vary with such factors as the response speeds of the low-side switching element Q1 and high-side switching element Q2, the inductance of the inductor Lr, and the capacitance of the capacitor Cr. The external resistors R31, R32 can be set so that each of the dead times becomes a required dead time. Therefore, switching loss can be reduced.

Sixth Preferred Embodiment

The second to fifth preferred embodiments are directed to the case of providing the high breakdown voltage driver IC 20 with a dead time control function. Likewise, it is also possible to provide the high breakdown voltage driver IC 20 with a cross time control function. A cross time refers to the time during which the first switching element Q1 and the second switching element Q2 become conducting simultaneously.

The cross time may become necessary depending on the circuit configuration of the converter circuit including the two switching elements. In the case where the high breakdown voltage driver IC 20 is provided with a cross time control function, the driving circuit 22 is provided with a cross time generating circuit that generates a first rectangular wave signal and a second rectangular wave signal while inserting a dead time, during which the first switching element Q1 and the second switching element Q2 become conducting simultaneously, between the two signals.

Also, as in the case of controlling the dead time, the following configurations are possible for the cross time as well. The duration of the cross time can be set by an external component such as an external resistor. A first cross time from the turn-off of the first switching element Q1 to the turn-on of the second switching element Q2, and a second cross time from the turn-off of the second switching element Q2 to the turn-on of the first switching element Q1 can be controlled individually. The first cross time and the second cross time are each set individually an external component.

Other Preferred Embodiments

The circuitry of the high breakdown voltage driver IC is configured to be adaptable to the switching control signal from the control IC 30, irrespective of whether the inputted signal is a digital signal (binary logic level signal) or an analog signal. This allows for adaptability to many applications, and the resulting economies of mass production can reduce the cost of the high breakdown voltage process IC.

According to various preferred embodiments of the present invention, only the starting circuit and the driving circuit are designed with high breakdown voltage, and hence the control IC is not required to have high breakdown voltage, thus allowing for use in combination with control ICs for a low breakdown voltage process used for many applications.

Also, the converter (power conversion) system is not limited to the current resonant type illustrated in the above preferred embodiments but the present invention is applicable to various systems with a high-side FET such as flyback, forward, half-bridge, and full-bridge, for example. Also, the present invention is applicable to not only a switching power supply but also a switching inverter, an electronic ballast such as a lamp lighting circuit, or the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power supply apparatus driving circuit which is provided in a power supply apparatus that outputs an auxiliary supply voltage, the power supply apparatus including a DC power supply input section to which a DC input voltage is inputted, a series circuit that is connected to both ends of the DC power supply input section directly or indirectly via a circuit element, and includes at least a first switching element on a low side and a second switching element on a high side, the first switching element and the second switching element having ground levels different from each other, and a switching element control circuit that generates a switching control signal to control the first switching element and the second switching element, the power supply apparatus driving circuit comprising:

a driving circuit that controls a voltage on a control terminal of each of the first switching element and the second switching element on a basis of the switching control signal; and a starting circuit that supplies a starting supply voltage to the switching element control circuit and the driving circuit from the DC input voltage at startup, the starting circuit shutting off supply of the starting supply voltage when the auxiliary supply voltage is supplied to the switching element control circuit and the driving circuit after startup.

2. The power supply apparatus driving circuit according to claim 1, wherein the starting circuit includes a depression-type high breakdown voltage MOSFET that supplies the starting supply voltage when driven into conduction.

3. The power supply apparatus driving circuit according to claim 1, wherein the driving circuit includes a rectangular wave signal generating circuit that generates a first rectangular wave signal that is outputted to the first switching element, and a second rectangular wave signal that is outputted to the second switching element, on a basis of the switching control signal defined by a single signal, so that the generated rectangular wave signals cause the first switching element and the second switching element to repeatedly switch on and off in a complementary manner.

4. The power supply apparatus driving circuit according to claim 1, wherein the driving circuit includes a rectangular wave signal generating circuit that generates a first rectangular wave signal that is outputted to the first switching element, and a second rectangular wave signal that is outputted to the second switching element, on a basis of the switching control signal defined by two signals that are repeatedly switched on and off in a complementary manner.

5. The power supply apparatus driving circuit according to claim 1, wherein the driving circuit includes a dead time generating circuit that generates the first rectangular wave signal and the second rectangular wave signal while inserting a dead time between the first rectangular wave signal and the second rectangular wave signal, so that the first switching element and the second switching element do not switch on simultaneously.

6. The power supply apparatus driving circuit according to claim 5, wherein the dead time generating circuit generates a first dead time from a falling edge of the first rectangular wave signal to a rising edge of the second rectangular wave signal, and a second dead time from a falling edge of the second rectangular wave signal to a rising edge of the first rectangular wave signal, the second dead time being regulated to a time different from the first dead time.

7. The power supply apparatus driving circuit according to claim 1, wherein the driving circuit includes a cross time generating circuit that generates the first rectangular wave signal and the second rectangular wave signal while inserting a cross time between the first rectangular wave signal and the second rectangular wave signal, so that the first switching element and the second switching element become conducting simultaneously.

8. The power supply apparatus driving circuit according to claim 7, wherein the cross time generating circuit generates a first cross time from a falling edge of the first rectangular wave signal to a rising edge of the second rectangular wave signal, and a second cross time from a falling edge of the second rectangular wave signal to a rising edge of the first rectangular wave signal, the second cross time being regulated to a time different from the first cross time.

9. A power supply apparatus driving circuit which is provided in a power supply apparatus, the power supply apparatus including a DC power supply input section to which a DC input voltage is inputted, a series circuit that is connected to both ends of the DC power supply input section, and includes at least a first switching element on a low side and a second switching element on a high side, the first switching element and the second switching element having ground levels different from each other, and a switching element control circuit that generates a switching control signal to control the first switching element and the second switching element, a driving circuit that controls a voltage on a control terminal of each of the first switching element and the second switching element on a basis of the switching control signal; wherein:

the driving circuit includes a dead time generating circuit that generates a first rectangular wave signal that is outputted to the first switching element, and a second rectangular wave signal that is outputted to the second switching element while inserting a dead time between the first rectangular wave signal and the second rectangular wave signal, the dead time being a time during which the first switching element and the second switching element do not switch on simultaneously; and the dead time generating circuit generates a first dead time from a falling edge of the first rectangular wave signal to a rising edge of the second rectangular wave signal, and a second dead time from a falling edge of the second rectangular wave signal to a rising edge of the first rectangular wave signal, the second dead time being regulated to a time different from the first dead time.

10. A power supply apparatus driving circuit which is provided in a power supply apparatus, the power supply apparatus including a DC power supply input section to which a DC input voltage is inputted, a series circuit that is connected to both ends of the DC power supply input section, and includes at least a first switching element on a low side and a second switching element on a high side, the first switching element and the second switching element having ground levels different from each other, and a switching element control circuit that generates a switching control signal to control the first switching element and the second switching element, a driving circuit that controls a voltage on a control terminal of each of the first switching element and the second switching element on a basis of the switching control signal; wherein the driving circuit includes a cross time generating circuit that generates a first rectangular wave signal that is outputted to the first switching element, and a second rectangular wave signal that is outputted to the second switching element while inserting a cross time between the first rectangular wave signal and the second rectangular wave signal, the cross time being a time during which the first switching element and the second switching element become conducting simultaneously; and the cross time generating circuit generates a first cross time from a falling edge of the first rectangular wave signal to a rising edge of the second rectangular wave signal, and a second cross time from a falling edge of the second rectangular wave signal to a rising edge of the first rectangular wave signal, the second cross time being regulated to a time different from the first cross time.

11. The power supply apparatus driving circuit according to claim 1, wherein the switching control signal is a digital signal configured by a binary logic level signal, or an analog signal.

12. A power supply apparatus driving integrated circuit comprising the power supply apparatus driving circuit according to claim 1, wherein the power supply apparatus driving circuit is configured by a single integrated circuit.

13. The power supply apparatus driving circuit according to claim 9, wherein the switching control signal is a digital signal configured by a binary logic level signal, or an analog signal.

14. A power supply apparatus driving integrated circuit comprising the power supply apparatus driving circuit according to claim 9, wherein the power supply apparatus driving circuit is configured by a single integrated circuit.

15. The power supply apparatus driving circuit according to claim 10, wherein the switching control signal is a digital signal configured by a binary logic level signal, or an analog signal.

16. A power supply apparatus driving integrated circuit comprising the power supply apparatus driving circuit according to claim 10, wherein the power supply apparatus driving circuit is configured by a single integrated circuit.

17. A power supply apparatus comprising:

a DC power supply input section to which a DC input voltage is inputted;

a series circuit that is connected to both ends of the DC power supply input section, and includes at least a first switching element on a low side and a second switching element on a high side, the first switching element and the second switching element having ground levels different from each other; and a switching element control circuit that generates a switching control signal to control the first switching element and the second switching element;

a driving circuit that controls a voltage on a control terminal of each of the first switching element and the second switching element on a basis of the switching control signal; and a starting circuit that supplies a starting supply voltage to the switching element control circuit and the driving circuit from the DC input voltage at startup, the starting circuit shutting off supply of the starting supply voltage when the auxiliary supply voltage is supplied to the switching element control circuit and the driving circuit after startup.

* * * * *